(12) United States Patent
Fourie et al.

(10) Patent No.: US 9,669,918 B1
(45) Date of Patent: Jun. 6, 2017

(54) SEALING DUCTS INTO A BALLOON

(71) Applicant: X Development LLC, Mountain View, CA (US)

(72) Inventors: Daniel Henry Fourie, Sunnyvale, CA (US); Jeffrey Neri, Gardnerville, NV (US)

(73) Assignee: X Development LLC, Mountain View, CA (US)

( * ) Notice: Subject to any disclaimer, the term of this patent is extended or adjusted under 35 U.S.C. 154(b) by 76 days.

(21) Appl. No.: 14/810,742

(22) Filed: Jul. 28, 2015

(51) Int. Cl.
| | |
|---|---|
| *B64B 1/40* | (2006.01) |
| *B64B 1/42* | (2006.01) |
| *B32B 37/00* | (2006.01) |
| *B32B 37/06* | (2006.01) |
| *B32B 37/18* | (2006.01) |
| *B32B 38/00* | (2006.01) |

(52) U.S. Cl.
CPC .......... *B64B 1/42* (2013.01); *B32B 37/0076* (2013.01); *B32B 37/06* (2013.01); *B32B 37/18* (2013.01); *B32B 38/0012* (2013.01); *B32B 2605/18* (2013.01)

(58) Field of Classification Search
CPC .............. B64B 1/40; B64B 1/42; B64B 1/58
See application file for complete search history.

(56) References Cited

U.S. PATENT DOCUMENTS

| | | |
|---|---|---|
| 2,756,948 A | 7/1956 | Winzen et al. |
| 2,900,147 A | 8/1959 | Huch et al. |
| 2,931,597 A | 4/1960 | Moore, Jr. |
| 2,960,282 A * | 11/1960 | Winzen ............ B64B 1/58 244/127 |
| 3,041,019 A | 6/1962 | Froehlich |
| 3,109,611 A * | 11/1963 | Yost ............ B29C 65/72 244/31 |
| 3,119,578 A | 1/1964 | Borgeson et al. |

(Continued)

FOREIGN PATENT DOCUMENTS

| | | |
|---|---|---|
| GB | 555831 A | 9/1943 |
| GB | 749791 A | 5/1956 |
| WO | 95/04407 A1 | 2/1995 |

OTHER PUBLICATIONS

Anatine_aero. Bovine Aerospace. The sky is not our limit. Tag Archives: weather balloon. Jun. 5, 2013, 14 pages. Retrieved from <http://bovineaerospace.wordpress.com/tag/weather-balloon/>.

*Primary Examiner* — Richard G Davis
(74) *Attorney, Agent, or Firm* — Lerner, David, Littenberg, Krumholz & Mentlik, LLP

(57) ABSTRACT

Aspects of the disclosure relate to techniques for manufacturing a balloon envelope including a duct for high altitude balloons. In one example, a first sheet of material may be provided. A premade duct may be arranged at least partially on the first sheet of material. The duct may include a first substance on an internal surface. A second sheet of material may be arranged over at least a portion of the duct. A heat sealing device may be applied to the second sheet of material to heat seal the first sheet of material to the second sheet of material. The heat sealing device may be applied over at least a portion of the duct in order to seal external surfaces of the duct to each of the first and second sheets of material and form a balloon gore. The first substance may keep the duct from being sealed to itself.

19 Claims, 10 Drawing Sheets

(56) References Cited

U.S. PATENT DOCUMENTS

| | | |
|---|---|---|
| 3,131,889 A | 5/1964 | Yost |
| 3,451,649 A | 6/1969 | Weiss et al. |
| 3,679,155 A | 7/1972 | Centofanti |
| 3,860,201 A | 1/1975 | Hall |
| 4,077,588 A | 3/1978 | Hurst |
| 4,262,864 A | 4/1981 | Eshoo |
| 4,432,513 A | 2/1984 | Yost |
| 4,434,958 A | 3/1984 | Rougeron et al. |
| 4,494,714 A | 1/1985 | Hill et al. |
| 4,529,153 A * | 7/1985 | Conn ............... B64B 1/58 244/126 |
| 4,651,956 A | 3/1987 | Winker et al. |
| 4,877,205 A * | 10/1989 | Rand ............... B29C 65/18 156/160 |
| 5,149,019 A | 9/1992 | Stenlund |
| 5,538,451 A | 7/1996 | Sherer |
| 5,992,795 A | 11/1999 | Tockert |
| 6,234,425 B1 | 5/2001 | Rand et al. |
| 6,325,329 B1 | 12/2001 | Meadows |
| 6,628,941 B2 | 9/2003 | Knoblach et al. |
| 7,203,491 B2 | 4/2007 | Knoblach et al. |
| 7,275,496 B2 | 10/2007 | French et al. |
| 7,356,390 B2 | 4/2008 | Knoblach et al. |
| 7,648,102 B2 | 1/2010 | French et al. |
| 7,801,522 B2 | 9/2010 | Knoblach et al. |
| 8,256,716 B2 | 9/2012 | Dietrich et al. |
| 8,644,789 B2 | 2/2014 | Knoblach et al. |
| 8,882,026 B2 | 11/2014 | Huens |
| 9,139,278 B1 | 9/2015 | Roach et al. |
| 2002/0175243 A1 | 11/2002 | Black et al. |
| 2003/0018351 A1 | 1/2003 | Kaji et al. |
| 2003/0040273 A1 | 2/2003 | Seligsohn et al. |
| 2004/0238692 A1 | 12/2004 | Kavanagh |
| 2005/0006523 A1 | 1/2005 | French et al. |
| 2005/0014499 A1 | 1/2005 | Knoblach et al. |
| 2005/0224639 A1 | 10/2005 | Kavanagh |
| 2006/0063529 A1 | 3/2006 | Seligsohn et al. |
| 2006/0192054 A1 | 8/2006 | Lachenmeier |
| 2007/0199503 A1 | 8/2007 | French et al. |
| 2009/0272840 A1 | 11/2009 | Dietrich et al. |
| 2010/0123040 A1 | 5/2010 | Baxter et al. |
| 2011/0297784 A1 | 12/2011 | Huens |
| 2013/0066267 A1 | 3/2013 | Kwok et al. |
| 2013/0261547 A1 | 10/2013 | Aggerholm et al. |
| 2014/0203135 A1 | 7/2014 | Walter |
| 2014/0277059 A1 | 9/2014 | Lam et al. |
| 2014/0367511 A1 | 12/2014 | Knoblach et al. |
| 2015/0266560 A1 | 9/2015 | Ratner et al. |

* cited by examiner

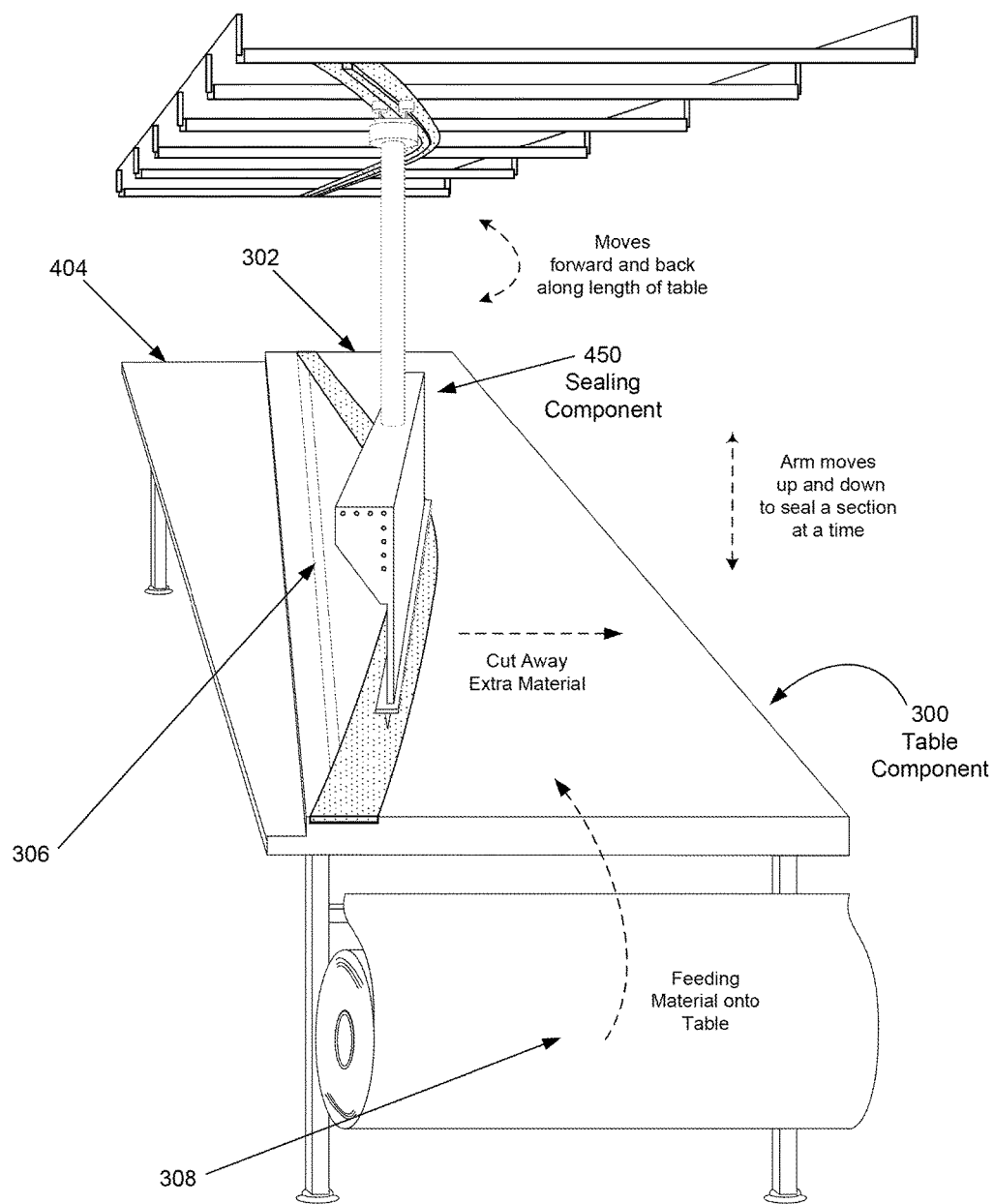

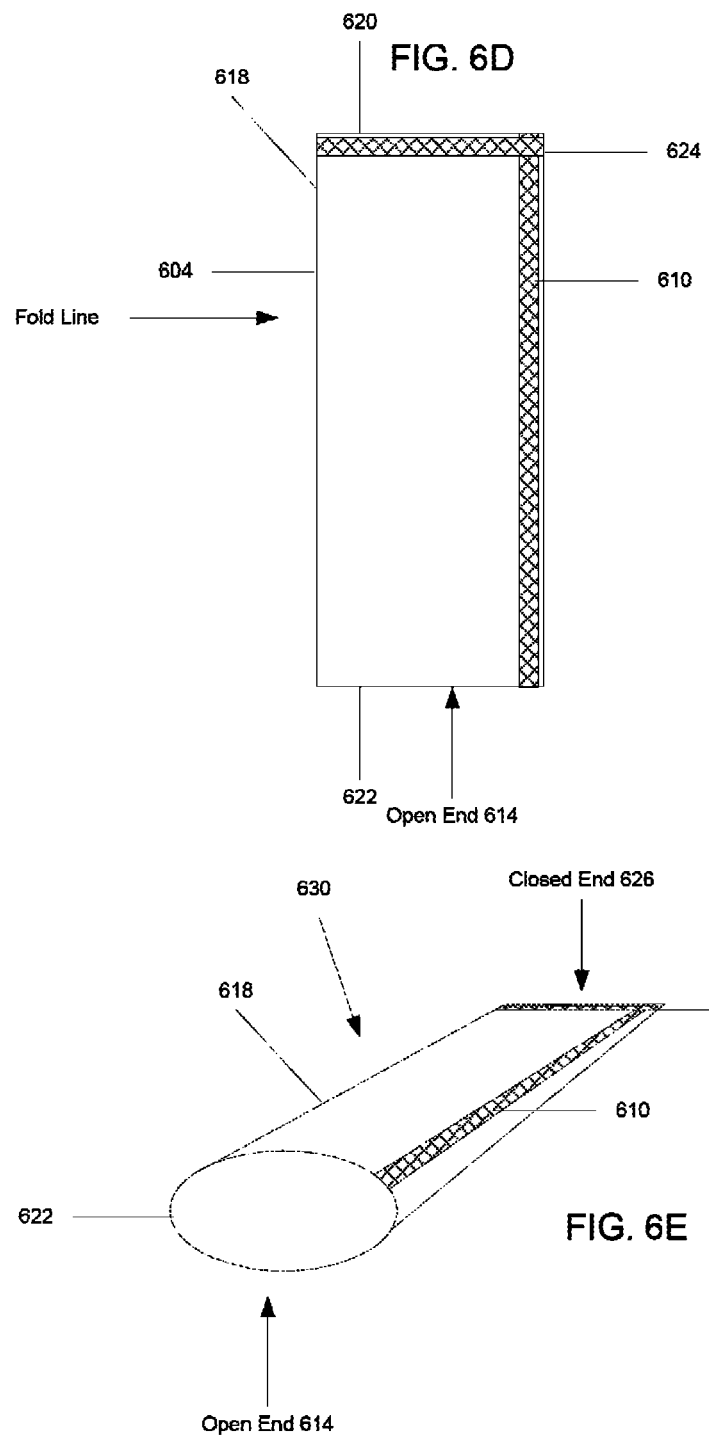

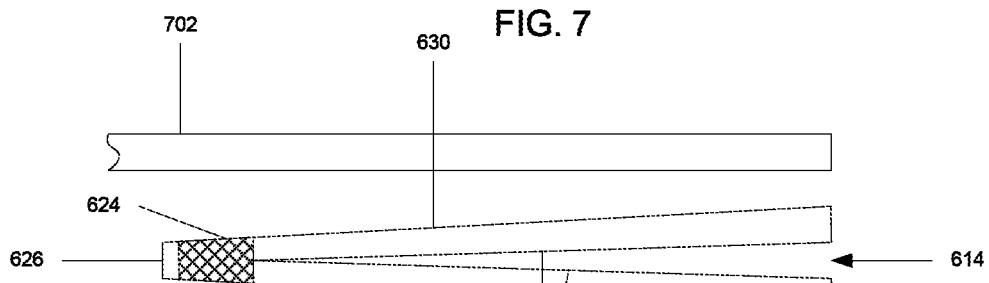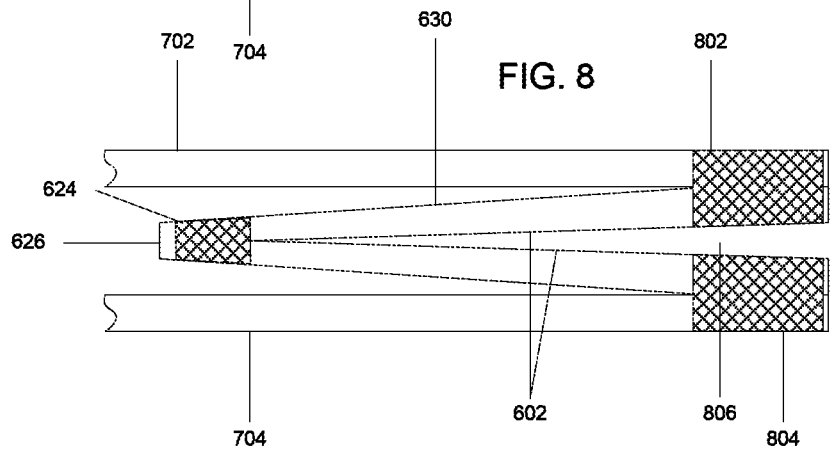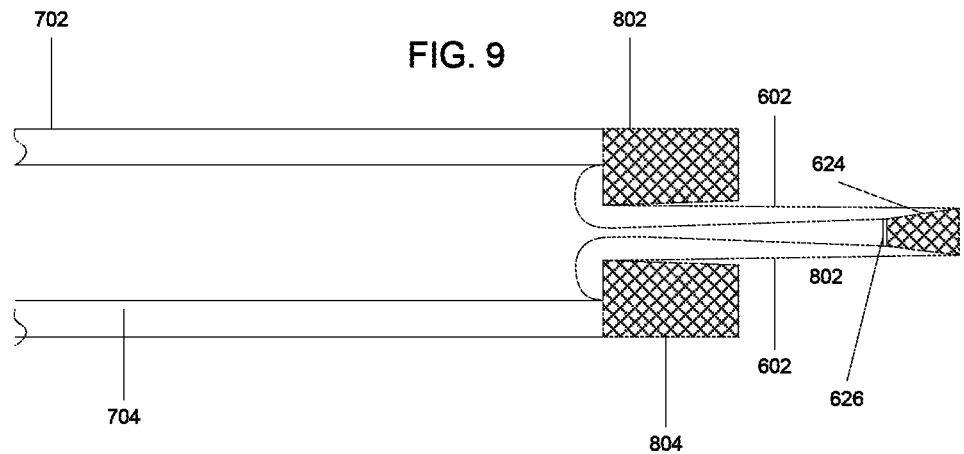

SEALING DUCTS INTO A BALLOON

BACKGROUND

Computing devices such as personal computers, laptop computers, tablet computers, cellular phones, and countless types of Internet-capable devices are increasingly prevalent in numerous aspects of modern life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

Some systems may provide network access via a balloon network operating in the stratosphere. Because of the various forces experienced by these balloons during deployment and operation, there is a balancing of needs between flexibility and stability of materials. The balloons may be made of an envelope material configured in sections or lobes to create a "pumpkin" or lobed balloon. The lobes are supported by a plurality of tendons.

In some instances, these balloons may require the use of a duct, such as to be used as a conduit to allow lift gas to escape from the balloon envelope. Thus, such ducts may be incorporated into or attached between the lobes of the balloon envelope during a manufacturing process.

BRIEF SUMMARY

Aspects of the present disclosure relate to a method of manufacturing a balloon envelope. The method includes providing a first sheet of material for a first gore of the balloon envelope and arranging a premade duct at least partially on the first sheet of material. The premade duct includes a first substance on an internal surface of the duct. The method also includes arranging a second sheet of material for a second gore of the balloon envelope over at least a portion of the premade duct; and applying a heat sealing device to the second sheet of material to heat seal the first sheet of material to the second sheet of material. The heat sealing device is applied over at least a portion of the duct in order to seal external surfaces of the duct to each of the first sheet of material and the second sheet of material. The first substance keeps the interior surface of the duct from being sealed to itself.

In one example, the duct includes an opening extending between a first open end and a second closed end. In this example, the method also includes, after applying the heat sealer, pulling the second closed end through the opening. In another example, the method also includes applying the first substance to a portion of duct material of the duct. In this example, the method also includes heat sealing two edges of the duct material to form the duct such that the duct includes the first open end and a second open end. In addition, the method also includes heat sealing the second open end to form the second closed end. In one example, the first substance includes a solvated thermoset ink, paint or dye. In another example, the first substance includes a high temperature thermoplastic ink, paint or dye.

A further aspect of the disclosure provides a method of manufacturing a duct for a balloon envelope of a high altitude balloon. The method includes providing a portion of material that will form the duct, folding the portion of material such that two edges of the material meet, heat sealing the two edges to one another using a heat sealing device such that the duct includes an opening extending between a first open end and a second open end, and arranging a first substance on an area of the portion of material. The first substance is configured to keep interior surface of the duct from being sealed to itself when a heat sealing device is applied to the duct.

In one example, the method also includes heat sealing the second open end to form a second closed end. In another example, the first substance includes a solvated thermoset ink, paint or dye. In another example, the first substance includes a high temperature thermoplastic ink, paint or dye.

Another aspect of the disclosure provides a system. The system includes a balloon envelope having a plurality of gores. Each gore of the plurality of gores is connected to an adjacent gore of the plurality gores via a heat seal. The system also includes a duct arranged at a heat seal between two adjacent gores of the plurality of gores. The duct includes a first open end opened into an interior of the balloon envelope, a second closed end extending from an external surface of the balloon envelope, a first outer surface heat sealed to a first of the two adjacent gores, a second outer surface heat sealed to a second of the two adjacent gores, and a first substance on an interior surface of the duct between the first outer surface and the second outer surface.

In one example, at least a portion of the duct is arranged to protrude normally from a surface of the balloon envelope. In another example, the first substance is configured to keep the interior surface of the duct from being sealed to itself. In another example, the duct includes an opening extending between a first open end and a second closed end. In another example, the open end of the duct is configured to receive lift gas from the balloon envelope and the closed end of the duct is configured to prevent lift gas from escaping from the envelope through the closed end of the duct. In another example, the second closed end is a heat seal that extends across the duct. In another example, the first substance includes a solvated thermoset ink, paint or dye. In another example, the first substance includes a high temperature thermoplastic ink, paint or dye. In another example, the system also includes a heat sealing device configured to form the heat seal between the two adjacent gores.

BRIEF DESCRIPTION OF THE DRAWINGS

FIG. 5 is an example of a balloon gore manufacturing apparatus in accordance with aspects of the present disclosure.

FIGS. 6A-6E are an example of a duct being manufactured in accordance with aspects of the present disclosure.

FIGS. 7-9 are example cross sectional views of portions of material for balloon envelope gores and a premade duct in accordance with aspects of the present disclosure.

DETAILED DESCRIPTION

Figure 1:
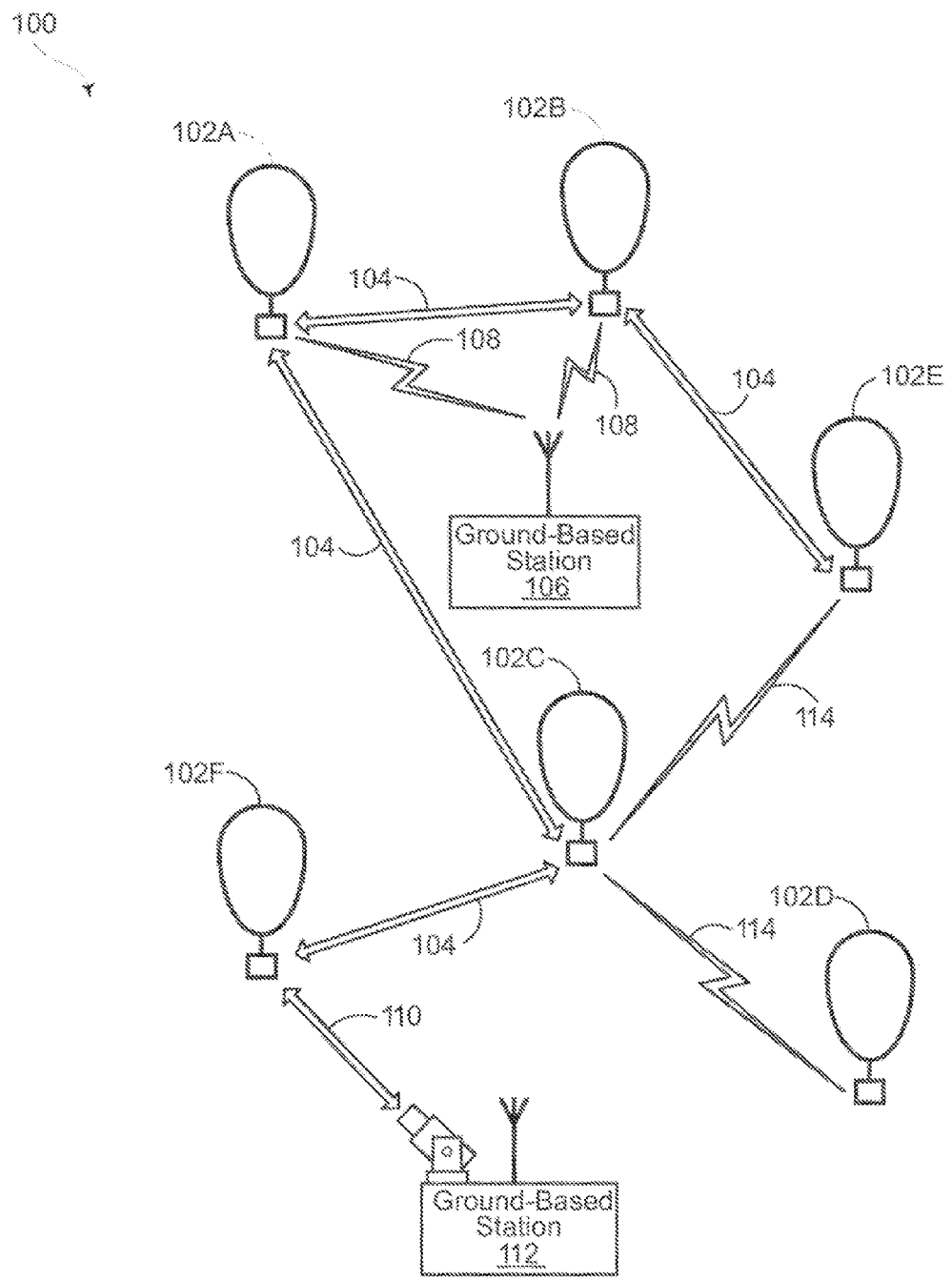
FIG. 1 is a functional diagram of a system in accordance with aspects of the present disclosure.

Aspects, features and advantages of the disclosure will be appreciated when considered with reference to the following description of embodiments and accompanying figures. The same reference numbers in different drawings may identify the same or similar elements. Furthermore, the following description is not limiting; the scope of the present technology is defined by the appended claims and equivalents. While certain processes in accordance with example embodiments are shown in the figures as occurring in a linear fashion, this is not a requirement unless expressly stated herein. Different processes may be performed in a different order or concurrently. Steps may also be added or omitted unless otherwise stated.

The present disclosure generally relates to providing techniques for launching high-altitude balloons such as those used in communication networks. A single network may include a large number of balloons, each of which includes a balloon envelope arranged to carry a payload of devices. In some circumstances, it may be useful to have a duct which extends from the balloon envelope. For example, if a particular balloon is in flight and needs to be brought back to the ground, a portion of the duct may be cut to allow lift gas to flow out of the balloon at a controlled rate. This may allow for a safe descent of the balloon and reduce the likelihood of damage to the payload. Adding such tubing after the balloon envelope has been completed can be a time consuming and difficult task. In that regard, the duct may also be attached to the balloon envelope during the manufacturing of the balloon envelope.

In some examples, manufacturing of the balloon envelope involves heat sealing portions of envelope material together in order to produce the gores. For instance, portions of material which will form the gores may be laid out on a table and then sealed together, for example, using a heat bond. This heat bond of the material can be employed using various techniques. In one example, a balloon gore sealing machine including a table and an overhead heat sealer, may be used in order to at least partially automate the manufacturing process. The heat sealer may be configured so that it can travel along a length of the table by traversing a track positioned above the table. The heat sealer may apply a heat bonding seal in order to join together the portions in a downward pressing motion, one section at a time. In this example, the heat sealer moves, seals and moves again until it completes a length of the balloon envelope made from bonding the portions together. By repeating this process several times, the balloon envelope may take its gored shape.

A duct may be premade from a single piece of material before being attached to a balloon envelope. A portion of the material may be treated with any number of different types of substances that when placed between two layers of the material will reduce the likelihood of the layers being heat sealed to one another. A tubular portion of the duct may be formed by folding the material and heat sealing the edge portions opposite of the fold together. Thus, the edge portions may not include the substance. This may result in a tubular body having two open ends wherein an interior surface of the tubular body includes the substance.

In some examples, prior to being attached to the balloon envelope, one of the two open ends of the tubular body may be heat sealed. As a result, the premade duct may include a tubular body having one open end and one closed end. In some examples, the closed end of the duct may be formed after a premade duct is attached to a balloon envelope. In addition, the duct may be arranged such that the portion having the substance is on an internal surface of the tubular portion.

The manufacturing process of heat sealing the balloon envelope may be used to attach the duct to a balloon envelope. For instance, the premade duct may be placed between two portions of material that will form two different gores. The portions of material and the premade duct may be heat sealed. Because of the location of the portion having the substance on the internal surface of the tubular portion, the heat seal will form a seal between each of the portions of material and the premade duct, but will prevent the premade duct from being sealed to itself.

After the portions of material are heat sealed, the closed end of the duct may be pulled through the tubular portion of the premade duct. This results in the duct being turned "inside out". As a result, the portion having the substance is now on the external surface of the premade duct and at least a portion of the premade duct will extend normally from the surface of the balloon envelope when the balloon envelope is inflated.

The features described above do not require an extra cutting step or a special sealing machine in order to connect the duct into the balloon envelope. Ducts may be premade and then sealed into the balloon in one simple operation thus reducing cycle time and the possibility of damaging the balloon envelope. These features also allow for multiple ducts to be attached to a balloon envelope. The size, length or width, of the duct may be easily adjusted without changing any of the tooling used to manufacture a balloon envelope. In addition, the features described above do not add to the number of seals, sealing machines, or sealing steps, thus reducing possibility of leaks in the balloon envelope.

FIG. 1 depicts an example system 100 in which a balloon as described above may be used. This example should not be considered as limiting the scope of the disclosure or usefulness of the features of the present disclosure. For example, the techniques described herein can be employed on various types of standalone balloons or balloons used with other types of systems. In this example, system 100 may be considered a "balloon network." the system 100 includes a plurality of devices, such as balloons 102A-F, ground base stations 106 and 112 and links 104, 108, 110 and 114 that are used to facilitate intra-balloon communications as well as communications between the base stations and the balloons. One example of a balloon is discussed in greater detail below with reference to FIG. 2.

Example Balloon

Figure 2:
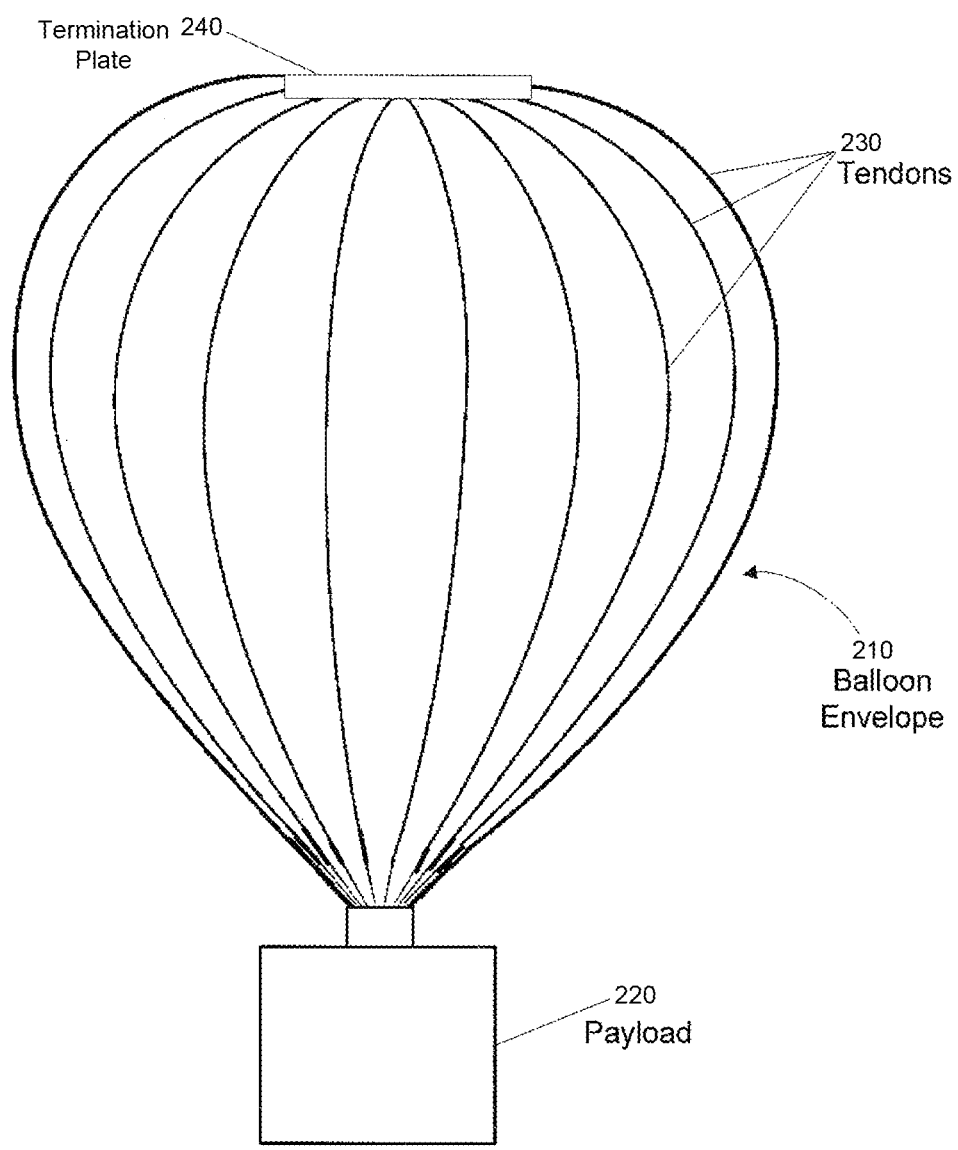
FIG. 2 is an example of a balloon in accordance with aspects of the present disclosure.

FIG. 2 is an example balloon 200, which may represent any of the balloons of balloon network 100. As shown, the balloon 200 includes an envelope 210, a payload 220 and a plurality of tendons 230, 240 and 250 attached to the envelope 210.

The balloon envelope 210 may take various forms. In one instance, the balloon envelope 210 may be constructed from materials such as polyethylene that do not hold much load while the balloon 200 is floating in the air during flight. Additionally, or alternatively, some or all of envelope 210 may be constructed from a highly flexible latex material or rubber material such as chloroprene. Other materials or combinations thereof may also be employed. Further, the shape and size of the envelope 210 may vary depending upon the particular implementation. Additionally, the envelope 210 may be filled with various gases or mixtures thereof, such as helium, hydrogen or any other lighter-thanair gas. The envelope 210 is thus arranged to have an associated upward buoyancy force during deployment of the payload 220.

The payload 220 of balloon 200 may be affixed to the envelope by a connection 260 such as a cable. The payload 220 may include a computer system (not shown), having one or more processors and on-board data storage. The payload 220 may also include various other types of equipment and systems (not shown) to provide a number of different functions. For example, the payload 220 may include an optical communication system, a navigation system, a positioning system, a lighting system, an altitude control system and a power supply to supply power to various components of balloon 200.

In view of the goal of making the balloon envelope 210 as lightweight as possible, it may be comprised of a plurality of envelope lobes or gores that have a thin film, such as polyethylene or polyethylene terephthalate, which is lightweight, yet has suitable strength properties for use as a balloon envelope. In this example, balloon envelope 210 is comprised of envelope gores 210A-210D.

Pressurized lift gas within the balloon envelope 210 may cause a force or load to be applied to the balloon 200. In that regard, the tendons 230-250 provide strength to the balloon 200 to carry the load created by the pressurized gas within the balloon envelope 210. In some examples, a cage of tendons (not shown) may be created using multiple tendons that are attached vertically and horizontally. Each tendon may be formed as a fiber load tape that is adhered to a respective envelope gore. Alternately, a tubular sleeve may be adhered to the respective envelopes with the tendon positioned within the tubular sleeve.

Top ends of the tendons 230, 240 and 250 may be coupled together using an apparatus, such as top plate 201 positioned at the apex of balloon envelope 210. Bottom ends of the tendons 230, 240 and 250 may also be connected to one another. For example, a corresponding apparatus, e.g., base plate 202, may be disposed at a base or bottom of the balloon envelope 210. The top plate 201 at the apex may be the same size and shape as and base plate 202 at the bottom of the balloon envelope. Both plates may include corresponding components for attaching the tendons 230, 240 and 250 to the balloon envelope 210.

In some examples, manufacturing of the balloon envelope involves heat sealing portions of envelope material together in order to produce the gores. For instance, portions of material which will form the gores may be laid out on a table and then sealed together, for example, using a heat bond. This heat bond of the material can be employed using various techniques.

Figure 3:
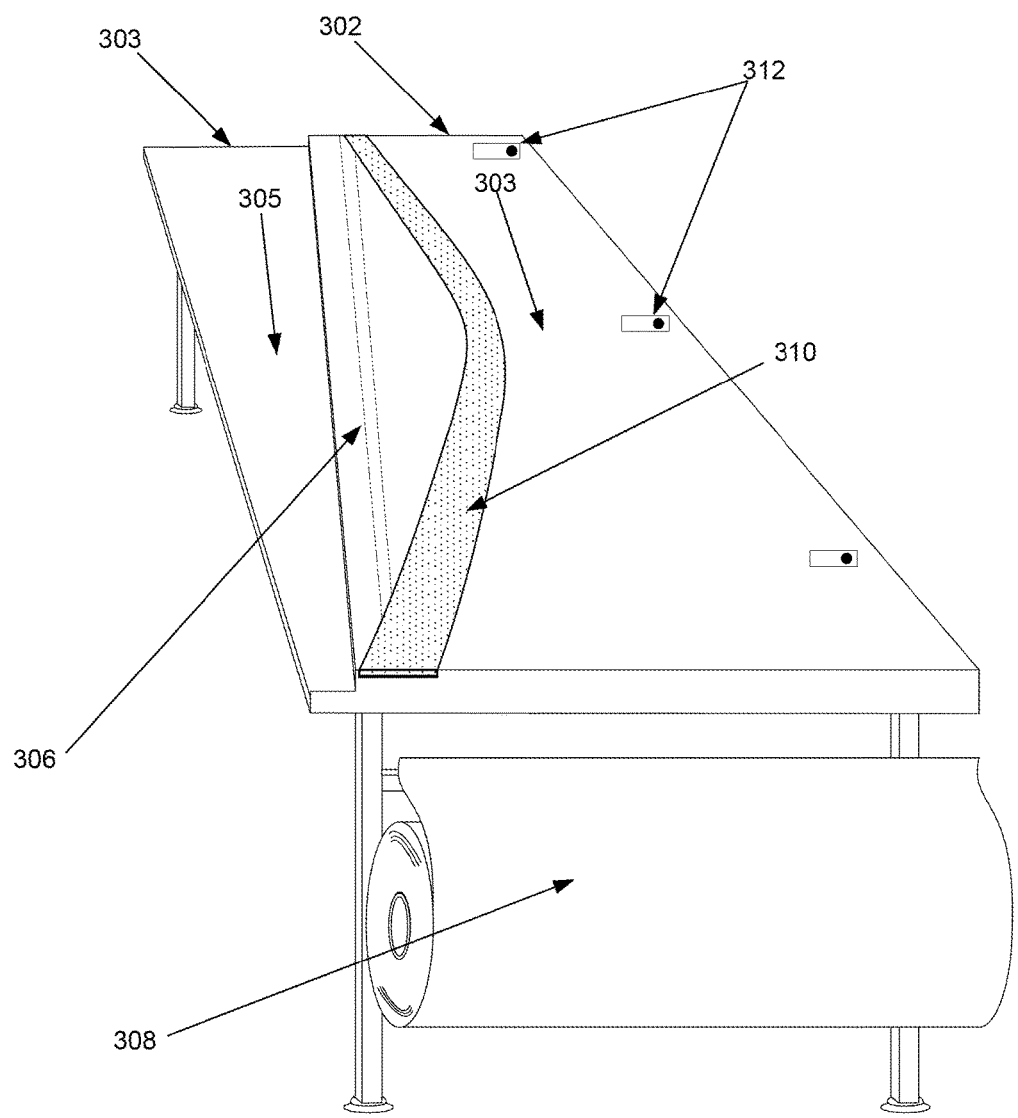
FIG. 3 is an example of a table component of a balloon gore manufacturing apparatus in accordance with aspects of the present disclosure.

In one example, a balloon gore sealing machine or assembly including a table may be used. In FIG. 3, one example of a table component 300 for the assembly is shown. As shown, the table component 300 includes a first level 302 and a second level 304 and an indicator 306 disposed on a surface 303 of the first level 302. The indicator 306 may be used to mark a position on the table component 300 for placing a tendon on an envelope gore being manufactured. The table component 300 made me used for shaping and heat-sealing together individual envelope gores made from sheets of balloon material 308 (shown as rolled). In this regard, the table component 300 also includes a curve strip 310 that can be used to indicate where the heat seal may occur, for example, at an edge of the envelope gore created from the roll of balloon material 308.

A sheet of the material 308 may be fed onto the table component 300 in order to create a given envelope gore. For example, a straight sheet of the balloon material 308 may be rolled out onto the table either manually or automatically using a belt driven track (not shown). Once the balloon material 308 is rolled out, it may be held down on the table component 300 using a series of restraints or clamps 312. The series of clamps 312 may help keep the balloon material 308 from shifting while it is being worked on.

First level 302 may be a working area of the table component 300. The first level 302 may include a smooth top layer of a compliant material, such as fiberglass and/or silicone, or other types of types of similar materials that have a level of heat resilience. The table component 300 may include also additional heat resistant material where the heat seal occurs, such as at curve strip 310. The curve strip 310 may include additional material, such as fiberglass impregnated with a polytetrafluoroethylene (PTFE) coating, which has a higher melting point than the top layer coating of the table component 300. This extra coating may also help prevent the material 308 from sticking to the table component 300 due do the heat sealing being conducted at the strip 310.

Second level 304 of the table component 300 may be configured for stacking up assembled envelope gores of the balloon envelope. For example, the second level 304 may include a trough like resting area for holding the envelope gores during manufacture. A surface 305 of the second level 304 may be configured so that the surface is wide enough to stack up a plurality of assembled envelope gores including the tendon attached to each gore portion.

Figure 4:
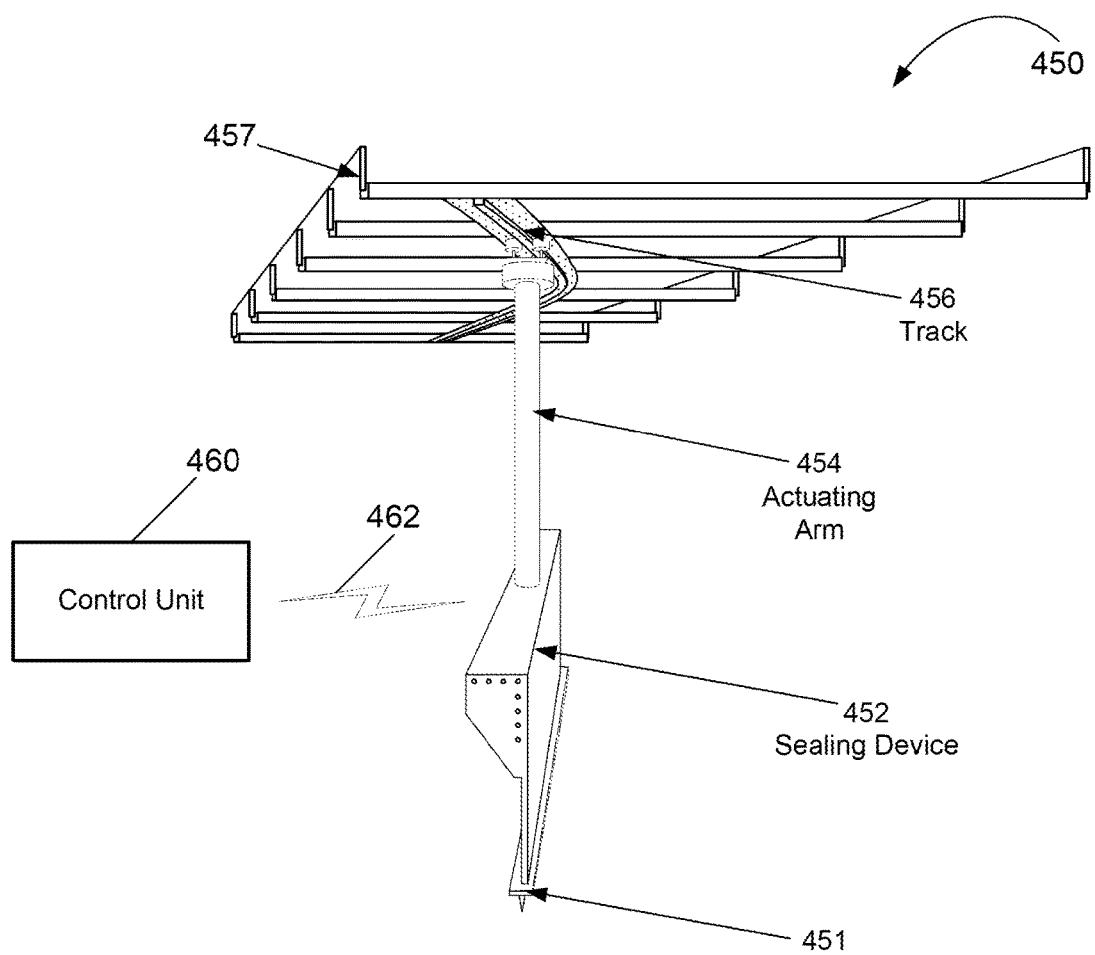
FIG. 4 is an example of a heat sealer component of a balloon gore manufacturing apparatus in accordance with aspects of the present disclosure.

An overhead heat sealer may be used in order to at least partially automate the manufacturing process. FIG. 4 is an example of a sealing component 450 for the assembly. In this example, the sealing component 450 includes a sealing device 452 coupled to the track 456 via an actuating arm 454. In some examples, a control unit 460 may be utilized for controlling operations of the sealing component 450 using communication link 462, which can be a wired or wireless link.

Sealing device 452 may include an electrically heatable element 451 disposed on the device. The heatable element 451 may be of a predetermined width and length that may be used to unite layers of the balloon material. For example, the heatable element 451, when activated, for example by a flow of electricity, may reach a certain temperature that is hot enough to heat bond or otherwise melting a section of two sheets of balloon material together. In some embodiments, sealing device 452 may provide a combination of operations for heat sealing and cutting of the balloon material 408. For example, the sealing device 452 may be configured to cut the balloon material 408 by using heat and an amount of pressure or blade like cutting members (not shown) attached to the heatable element 451.

The sealing component 450 may be configured so that it can travel along a length of the table by traversing a track positioned above the table. For example, sealing device 452 may be moved along track 456 mounted on an overhead support 457. The track 456 can be configured so that sealing device 452 can move forward and back horizontally by using actuating arm 454. This forward and back movement of the sealing device 452 along track 456 can be manually or automatically operated, for example, by using commands from the communication unit 460.

The actuating arm 454 can also be activated to cause the sealing device 452 to move vertically. For example, the actuating arm 454 may include housing (not shown) that can extend and retract the arm between first and second positions. In some aspects, extension of the actuating arm 454 allows the sealing device 452 to be pressed against the balloon material in order to cause the heat bond activation. As with the movement along track 452, the actuating arm 454 can extend and/or retract manually, automatically or some combination thereof, for example, by using commands from communication unit 460.

FIG. 5 is an example of a balloon gore sealing assembly 500, which may include machinery components such as the table component 300 and sealing component 400 as described above. The assembly 500 may be used to manufacture envelope gores for balloons. To join the sheets of film material together, sealing component 450 may move forward and back from one end of table component 300 to an opposite end, thereby traversing along a length of the table component 300. The sealing component 450 may operate by heat sealing a section, for example by one meter more or less in length, of the balloon envelope material 308 resting on the first level. For example, sealing component. 450 may be pressed down on the table component 300 for heating sealing a particular section of the envelope gore material and subsequently lifted up and moved to a next section to be heat sealed. This up, move and down motion of the sealing component 450 can be repeated until the entire length of the laid out material is heat sealed in successive sections resulting in a completed envelope gore. The process of manufacturing envelope gores can be repeated with the successive sheets of material 408 until a sufficient number of gores have been manufactured.

In some examples, a duct may be heat sealed into a gore of a balloon envelope using the balloon gore sealing assembly 500. The duct may be pre-formed from a single piece material before being heat sealed into the gore. As discussed in more detail below, the configuration of the duct may prevent the duct from being completely heat sealed with the balloon envelope material.

For example, when manufacturing the duct, a portion of the material may be treated with any number of different types of substances that when placed between two layers of the material will reduce the likelihood of the layers being heat sealed to one another. Examples of such substances may include solvated thermoset inks, paints or dyes as well, as high temperature thermoplastic inks, paints or dyes. These may thus include permanent markers, metal working layout fluid, screen printing inks, as well as spray paints.

Figure 6A:
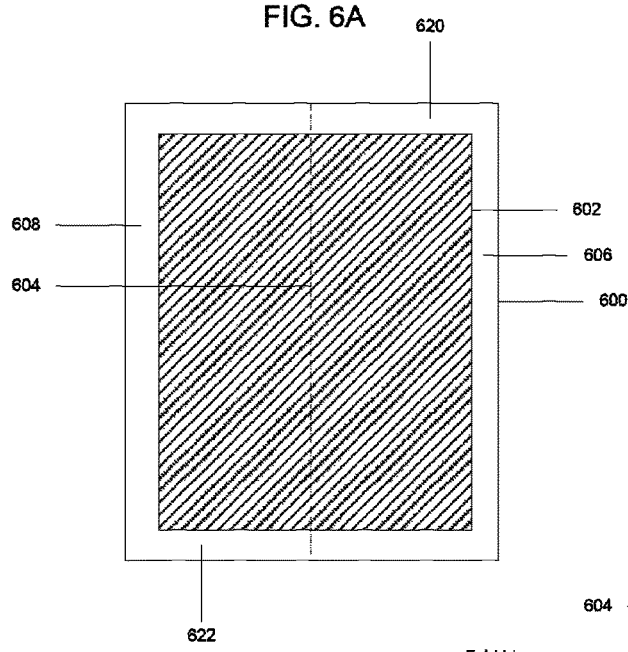

For example, as shown in FIG. 6A, a single piece of material 600 may be used to form a duct. The material may be the same material, used to manufacture the balloon gores, such as a thin polyethylene or polyethylene terephthalate film. The material 600 may include an area 602 having a substance, such as those described above that reduce the likelihood of the material being heat sealed together.

Figure 6B:
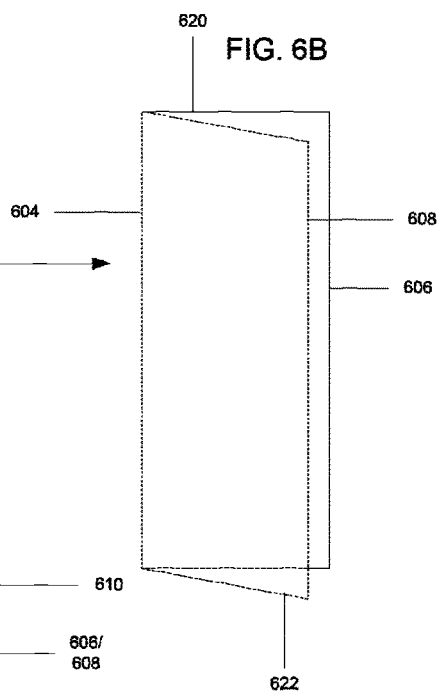
Figure 6C:
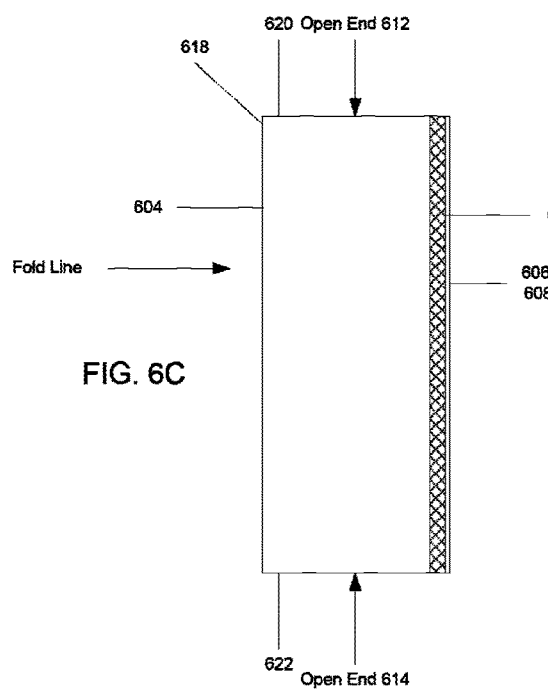

To form the duct, the material may be folded in half along a fold line. For example, as shown in FIG. 6B, material 600 is folded, along fold line 604 (see FIG. 6A). In this regard, edge portions 606 and 608 may meet. These edge portions may then be heat sealed to one another, for example, using the sealing component 450 of the balloon gore sealing assembly 500 or a handheld heat sealer (not shown). In this regard, edge portions 606 and 608 do not include the substance. This enables edge portions 606 and 608 to be heat sealed to one another securely at heat seal 610.

Sealing edge portions 606 and 608 may result in a tubular body 618 having two open ends 612 and 614 at edge portions 620 and 622 of material 600, respectively. In addition, because of the folding, an interior surface of the tubular body 618 includes the substance. Alternatively, rather than folding the material 600 having area. 602 with a substance as discussed above, the substance may be applied to an external surface of the tubular body 618 before or after folding and/or heat sealing at heat seal 610. In this regard, the tubular body 618 may be turned inside out, such that the interior surface now becomes the exterior surface and the exterior surface becomes the interior surface. In this way, the substance is then on an interior surface of the tubular body 618.

In some examples, prior to being attached to the balloon envelope, one of the two open ends may be heat sealed. In this regard, neither edge portion 620 or 622 of FIG. 6A may include the substance. As shown in FIG. 6D, edge portion 620 is heat sealed along heat seal 624. Edge portion 620 may be heat sealed to itself, for example, using the sealing component 450 of the balloon gore sealing assembly 500 or a handheld heat sealer (not shown).

As a result, the premade duct may include a tubular body having one open end and one closed end. For example, as shown in FIG. 6E, heat seal 624 forms a closed end 626 and open end 614 may remain open. In some examples, the closed end of the duct may be formed after a premade duct is attached to a balloon envelope. The result is a pre-made duct 630 that may be heat sealed into material 308 of a balloon envelope.

The manufacturing process of heat sealing the balloon envelope may be used to attach the duct to a balloon envelope. In order to do so, two portions of material 308 may be arranged out on table component 300 as discussed above. The premade duct. 630 may be placed between two portions of material 308 that will form two different gores. FIG. 7 is an example cross sectional view through two portions 702 and 704 of material 308 which will become two different gores of a finished balloon envelope. Duct 630 may be arranged between the two portions such that the open end 614 of the duct is oriented generally towards the first level 303 of table component 300 and closed end 626 is oriented generally towards the second level 305 of the table component 300. As shown in FIG. 7, at least the closed end 626 of the duct 630 must be placed between the two portions 702 and 704.

The portions of material and the premade duct may be heat sealed. As discussed above, the heat sealer 450 may move, along the track 456 sealing portions of the material 308 until the heat sealer 450 reaches the two portions 702 and 704 that includes the duct. At this point, the sealing device 452 may be lowered via arm 454 and pressed against the portion 702. This may heat seal the duct between and to both of the portions 702 and 704 of material 308. The result may form heat seals 802 and 804 of FIG. 8. Because of the location of the area 602 having the substance on the internal surface of the tubular portion, the heat seal will form a seal between each of the two portions 702 and 704 of material 308 and the corresponding surface of the premade duct, but will prevent the premade duct from being sealed to itself. For example, as shown in FIG. 8, the area 602 is not heat sealed to itself and thus forms an opening 806 between the two heat seals 802 and 804.

Figure 10:
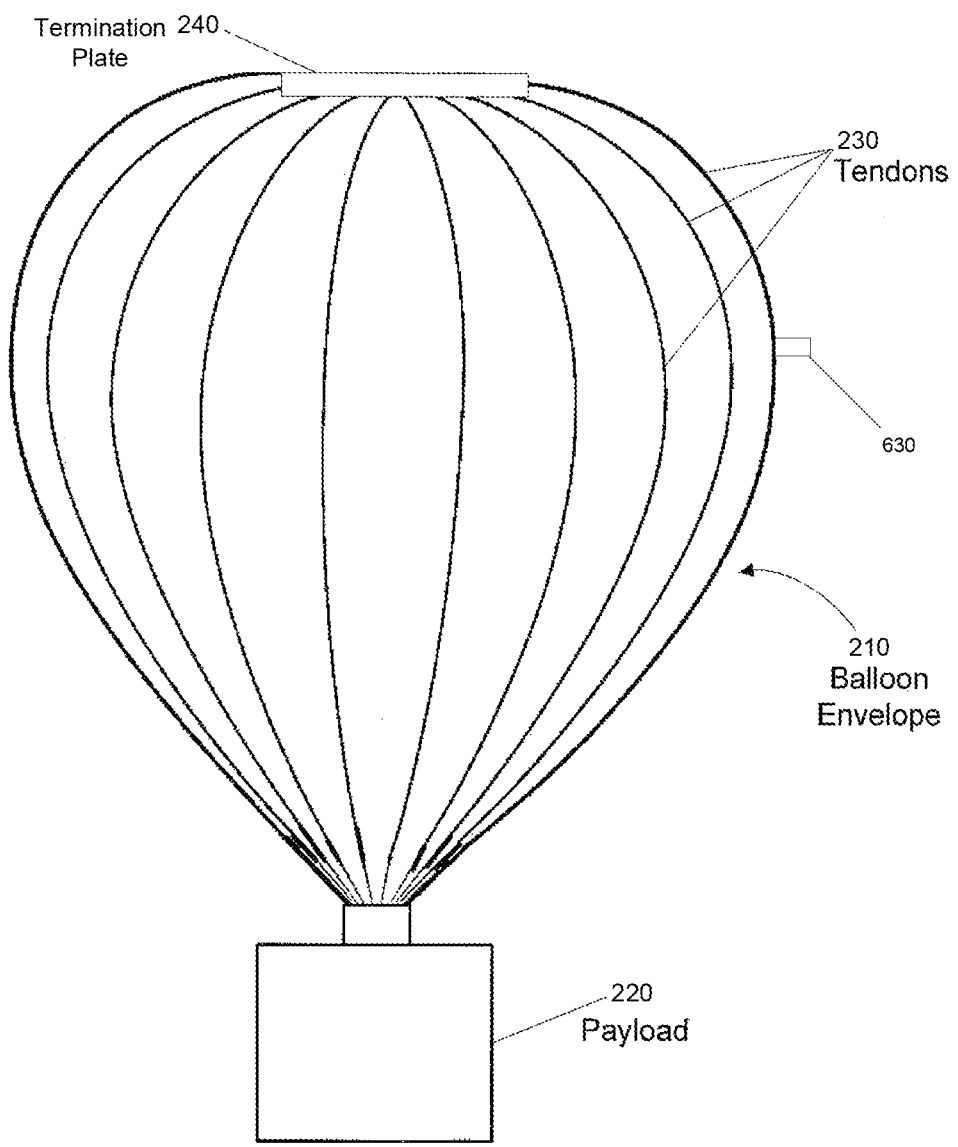
FIG. 10 is an example of a balloon in accordance with aspects of the present disclosure.

After the portions of material are heat sealed, the closed end of the duct may be pulled through the tubular portion of the premade duct. This results in the duct being turned "inside out". As a result, as shown in FIG. 9 area 602 having the substance is now on an external surface of the premade duct 630. When the gores of the balloon envelope are completed as discussed above and the balloon envelope is filled with lift gas, at least a portion of the premade duct will extend normally from the surface of the balloon envelope when the balloon envelope is inflated as shown in FIG. 10.

Figure 11:
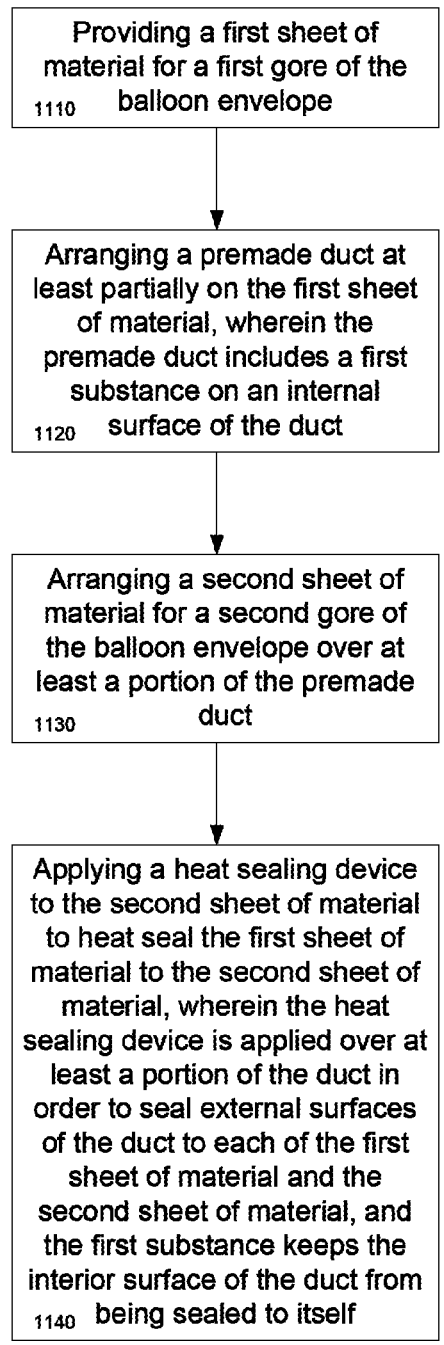
FIG. 11 is a flow diagram depicting an example of a method in accordance with aspects of the present disclosure.

To better aid in understanding an example of some of the aspects described above, reference is now made to FIG. 11, which illustrates a flow diagram 1100 depicting a method of manufacturing a balloon envelope. As previously discussed, the following operations do not have to be performed in the precise order described below. Rather, as mentioned above, various operations can be handled in a different order or simultaneously, and operations may be added or omitted.

In this example, a first sheet of material for a first gore of the balloon envelope is provided at block 1110. A premade duct is arranged at least partially on the first sheet of material at block 1120. The premade duct includes a first substance on an internal surface of the duct. A second sheet of material for a second gore of the balloon envelope is arranged over at least a portion of the premade duct at block 1130. A heat sealing device is applied to the second sheet of material to heat seal the first sheet of material to the second sheet of material at block 1140. The heat sealing device is applied over at least a portion of the duct in order to seal external surfaces of the duct to each of the first sheet of material and the second sheet of material. In addition, the first substance keeps the interior surface of the duct from being sealed to itself.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of manufacturing a balloon envelope, the method comprising:
   providing a first sheet of material for a first gore of the balloon envelope;
   arranging a premade duct at least partially on the first sheet of material, wherein the premade duct includes a first substance on an internal surface of the duct;
   arranging a second sheet of material for a second gore of the balloon envelope over at least a portion of the premade duct; and
   applying a heat sealing device to the second sheet of material to heat seal the first sheet of material to the second sheet of material, wherein the heat sealing device is applied over at least a portion of the duct in order to seal external surfaces of the duct to each of the first sheet of material and the second sheet of material, and the first substance keeps the internal surface of the duct from being sealed to itself.

2. The method of claim 1, wherein the duct includes an opening extending between a first open end and a second closed end, and the method further comprises, after applying the heat sealing device, pulling the second closed end through the opening.

3. The method of claim 1, further comprising applying the first substance to a portion of duct material of the duct.

4. The method of claim 3, further comprising heat sealing two edges of the duct material to form the duct such that the duct includes the first open end and a second open end.

5. The method of claim 4, further comprising, heat sealing the second open end to form the second closed end.

6. The method of claim 1, wherein the first substance includes a solvated thermoset ink, paint or dye.

7. The method of claim 1, wherein the first substance includes a high temperature thermoplastic ink, paint or dye.

8. The method of claim 1, further comprising, manufacturing the premade duct by:
   providing a portion of material that will form the duct;
   folding the portion of material such that two edges of the material meet; and
   heat sealing the two edges to one another using a heat sealing device such that the duct includes an opening extending between a first open end and a second open end.

9. The method of claim 8, wherein manufacturing the premade duct further includes, prior to folding the portion of material, arranging the first substance on an area of the portion of material such that the first substance is located on the internal surface when the portion of material is folded.

10. The method of claim 9, wherein manufacturing the premade duct further includes, after heat sealing the two edges, heat sealing the second open end to form a second closed end.

11. A system comprising:
    a balloon envelope having a plurality of gores, wherein each gore of the plurality of gores is connected to an adjacent gore of the plurality of gores via a heat seal; and
    a duct arranged at a heat seal between two adjacent gores of the plurality of gores, the duct having a first open end opened into an interior of the balloon envelope, a second closed end extending from an external surface of the balloon envelope, a first outer surface heat sealed to a first of the two adjacent gores, a second outer surface heat sealed to a second of the two adjacent gores, and a first substance on an interior surface of the duct between the first outer surface and the second outer surface.

12. The system of claim 11, wherein at least a portion of the duct is arranged to protrude normally from a surface of the balloon envelope.

13. The system of claim 11, wherein the first substance is configured to keep the interior surface of the duct from being sealed to itself.

14. The system of claim 11, wherein the duct includes an opening extending between a first open end and a second closed end.

15. The system of claim 11, wherein the first open end of the duct is configured to receive lift gas from the balloon envelope and the second closed end of the duct is configured to prevent lift gas from escaping from the balloon envelope through the closed end of the duct.

16. The system of claim 11, wherein the second closed end is a heat seal that extends across the duct.

17. The system of claim 11, wherein the first substance includes a solvated thermoset ink, paint or dye.

18. The system of claim 11, wherein the first substance includes a high temperature thermoplastic ink, paint or dye.

19. The system of claim 11, further comprising a heat sealing device configured to form the heat seal between the two adjacent gores.

* * * * *